(12) United States Patent
Crook et al.

(10) Patent No.: US 11,881,695 B2
(45) Date of Patent: Jan. 23, 2024

(54) OPEN SPLICE ELECTRICAL BOX, METHOD OF MANUFACTURE, AND METHOD OF USE

(71) Applicants: Dale J. Crook, Overland Park, KS (US); Richard G. Brull, North Kansas City, MO (US)

(72) Inventors: Dale J. Crook, Overland Park, KS (US); Richard G. Brull, North Kansas City, MO (US)

(*) Notice: Subject to any disclaimer, the term of this patent is extended or adjusted under 35 U.S.C. 154(b) by 91 days.

(21) Appl. No.: 17/509,370

(22) Filed: Oct. 25, 2021

(65) Prior Publication Data
US 2022/0131356 A1   Apr. 28, 2022

Related U.S. Application Data

(60) Provisional application No. 63/104,688, filed on Oct. 23, 2020.

(51) Int. Cl.
*H02G 3/08* (2006.01)
*H02G 3/16* (2006.01)
*H02G 15/24* (2006.01)
*H02G 3/12* (2006.01)

(52) U.S. Cl.
CPC .............. *H02G 3/16* (2013.01); *H02G 3/081* (2013.01); *H02G 3/125* (2013.01); *H02G 15/24* (2013.01)

(58) Field of Classification Search
CPC ............ H02G 3/08; H02G 3/081; H02G 3/16; H02G 3/125; H02G 3/14; H02G 3/12; H02G 3/088; H05K 5/00; H05K 5/02; H01R 13/46; H01R 13/52

USPC .. 174/480, 481, 50, 53, 57, 58, 59, 520, 61, 174/488, 66, 63; 220/3.2–3.9, 4.02; 248/906

See application file for complete search history.

(56) References Cited

U.S. PATENT DOCUMENTS

| | | | | |
|---|---|---|---|---|
| 5,834,692 A * | 11/1998 | Lentz | ..................... | H02G 3/088 174/57 |
| 6,956,169 B1 * | 10/2005 | Shotey | ................... | H02G 3/121 174/67 |
| 7,476,806 B2 * | 1/2009 | Dinh | ...................... | H02G 3/086 174/58 |
| 7,598,452 B1 * | 10/2009 | Shotey | ................. | H01R 13/652 174/67 |
| 7,619,162 B2 * | 11/2009 | Dinh | ....................... | H02G 3/12 174/53 |
| 7,989,699 B1 * | 8/2011 | Shotey | ..................... | H02G 3/14 33/528 |
| 8,962,997 B2 * | 2/2015 | Conway | ................. | H02G 3/081 174/59 |

* cited by examiner

*Primary Examiner* — Angel R Estrada
(74) *Attorney, Agent, or Firm* — Law Office of Mark Brown, LLC; Christopher M DeBacker; Mark E Brown (57) ABSTRACT

A one-piece injection molded plastic electrical box. The box has an integrated lid which is connected to the body of the box via a living hinge, also formed during the molding process. Four slots on either of four walls allow wires to enter the box from all sides. These openings have doors are designed to bend down, allowing space for the wires to be inserted. Once all wires are placed within the box, the top lid is closed and latched. The bent opening doors act as clamps to secure the wires by applying pressure to the wires as those doors attempt to bend back to their original orientation. This box may be installed without requiring power to be cut off to the splice connection.

7 Claims, 12 Drawing Sheets

FIG. 9

OPEN SPLICE ELECTRICAL BOX, METHOD OF MANUFACTURE, AND METHOD OF USE

CROSS-REFERENCE TO RELATED APPLICATION

This application claims priority in U.S. Provisional Patent Application No. 63/104,688 Filed Oct. 23, 2020, which is incorporated herein by reference.

BACKGROUND OF THE INVENTION

1. Field of the Invention

The present invention relates generally to an electrical box and method for use thereof, and more specifically to a one-piece electrical box for quickly containing open wiring splices.

2. Description of the Related Art

A common problem, especially in older homes, are electrical connections made without being housed in a junction box per typical code requirements. These connections are commonly referred to as "open splices." Until now, there have been two common ways of resolving open splices.

The first is to disconnect the power to the splice, disassemble the splice, and wire the connection up properly within a junction box with a lid. The second is to install an open splice junction box. These open splice junction boxes are made of steel, require multiple screws and parts, and are expensive and time consuming to install. What is needed is an inexpensive, easy to use open splice box.

Heretofore there has not been available a system or method for an electrical box with the advantages and features of the present invention.

BRIEF SUMMARY OF THE INVENTION

The present invention generally provides a one-piece injection molded plastic electrical box. The box has an integrated lid which is connected to the body of the box via a living hinge, also formed during the molding process. Four slots on either of four walls allow wires to enter the box from all sides. These openings have doors which are designed to bend down, allowing space for the wires to be inserted. Once all wires are placed within the box, the top lid is closed and latched. The bent opening doors act as clamps to secure the wires by applying pressure to the wires as those doors attempt to bend back to their original orientation. This box may be installed without requiring power to be cut off to the splice connection.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment One-Piece Electrical Box 2

As shown in FIGS. 1-9, the present invention incudes a one-piece electrical box 2, which is entirely molded and formed from a single piece of material. The electrical box 2 has a base portion 4 and a lid portion 6. The base portion has a floor 8, a rear wall 18, a front wall 20, and four side walls 22. Each side wall 22 includes a removable door 16 where wires can be inserted for an open splice within the box 2. The front wall 20 includes at least one clasp receiver 12 for receiving a clasp 10 connected to the lid portion 6.

The lid portion 6 has a top face 9 and is joined to the base portion 4 via a living hinge 21, all formed from the same material as the lid portion 6 and base portion 4.

Mounting holes 14 in the base portion 4 are associated with mounting holes 28 in the lid portion 6 such that the entire assembly can be secured and closed up using a pair of mounting elements 40, such as nails or screws, that would pass through the lid portion 6 mounting holes 28 through the base portion 4 mounting holes 14 and into a mounting surface 42, such as a stud of a wall or a ceiling joist.

Reinforced holes 24 can be punched out within the floor 8 to allow for additional wires to be drawn into the box. These, like the removable doors 16 allow the box 2 to be customized to have one or more openings to be opened allowing access to wires to be joined within the box 2. The holes 24 would have a thin layer of material which is pierceable by the mounting elements 40. This material would be the same material that the rest of the box 2 is formed from.

Figure 1:
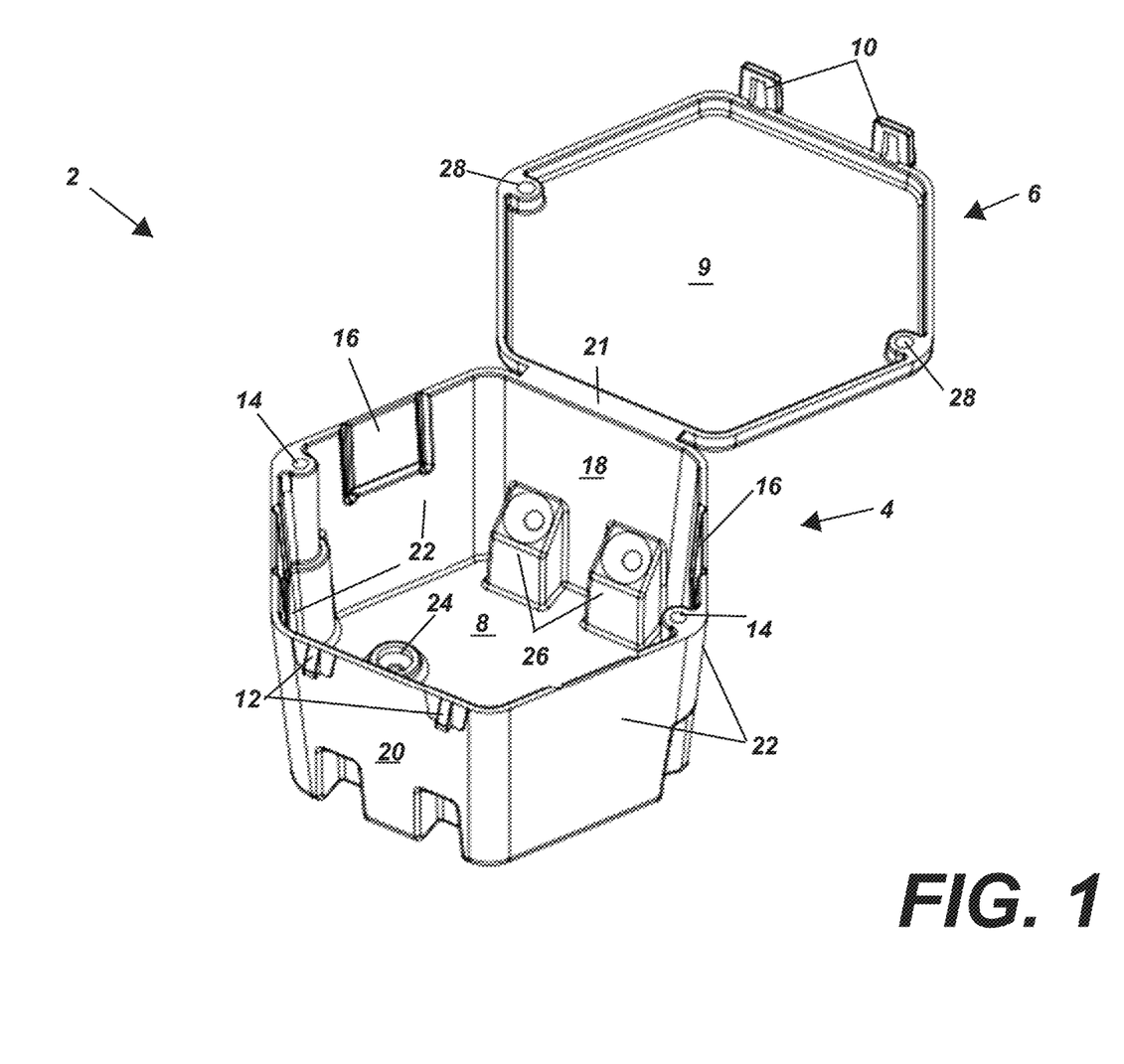
FIG. 1 is a three-dimensional top-down view of a preferred embodiment of the present invention.
Figure 2:
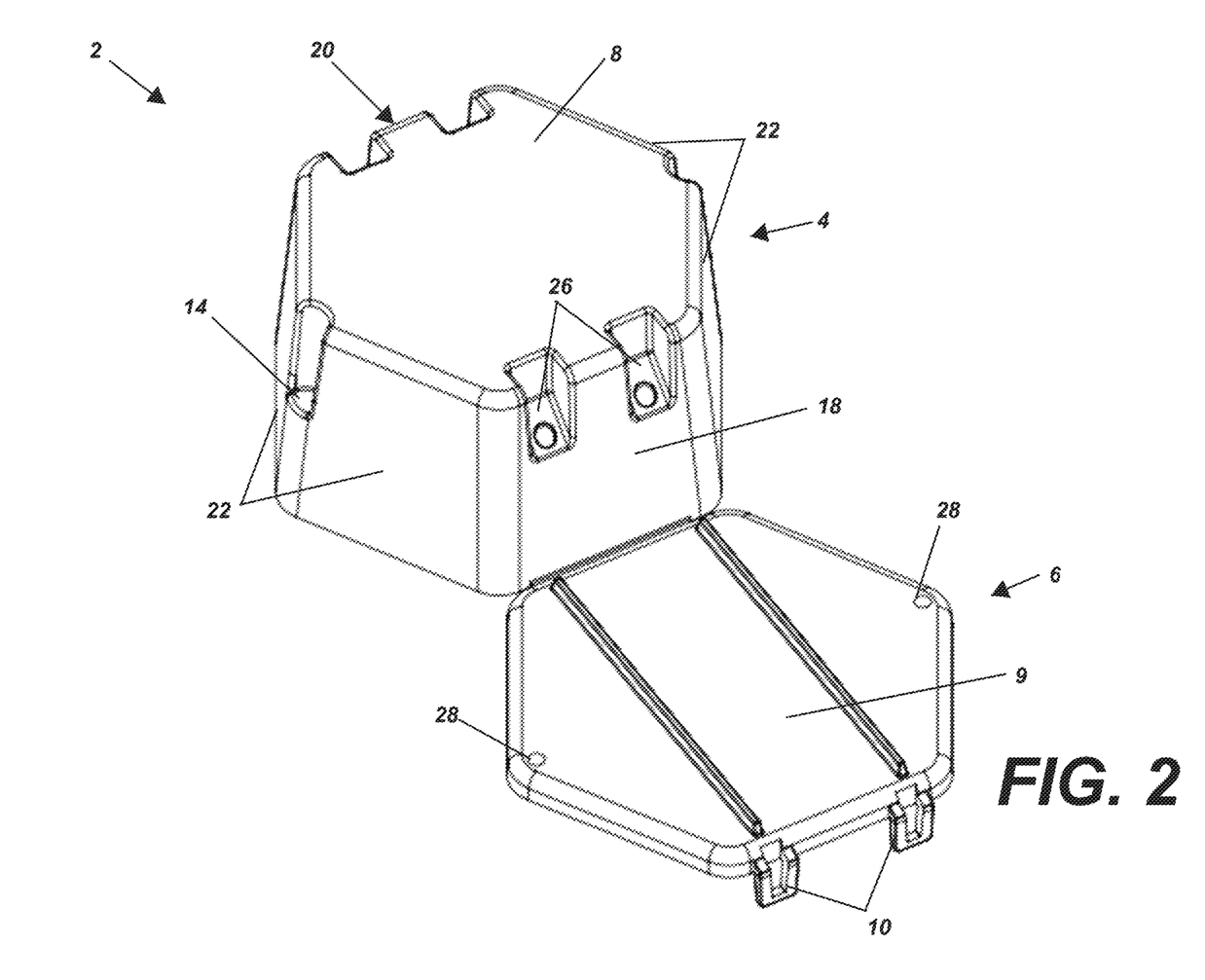
FIG. 2 is a three-dimensional bottom-up view thereof.
Figure 3:
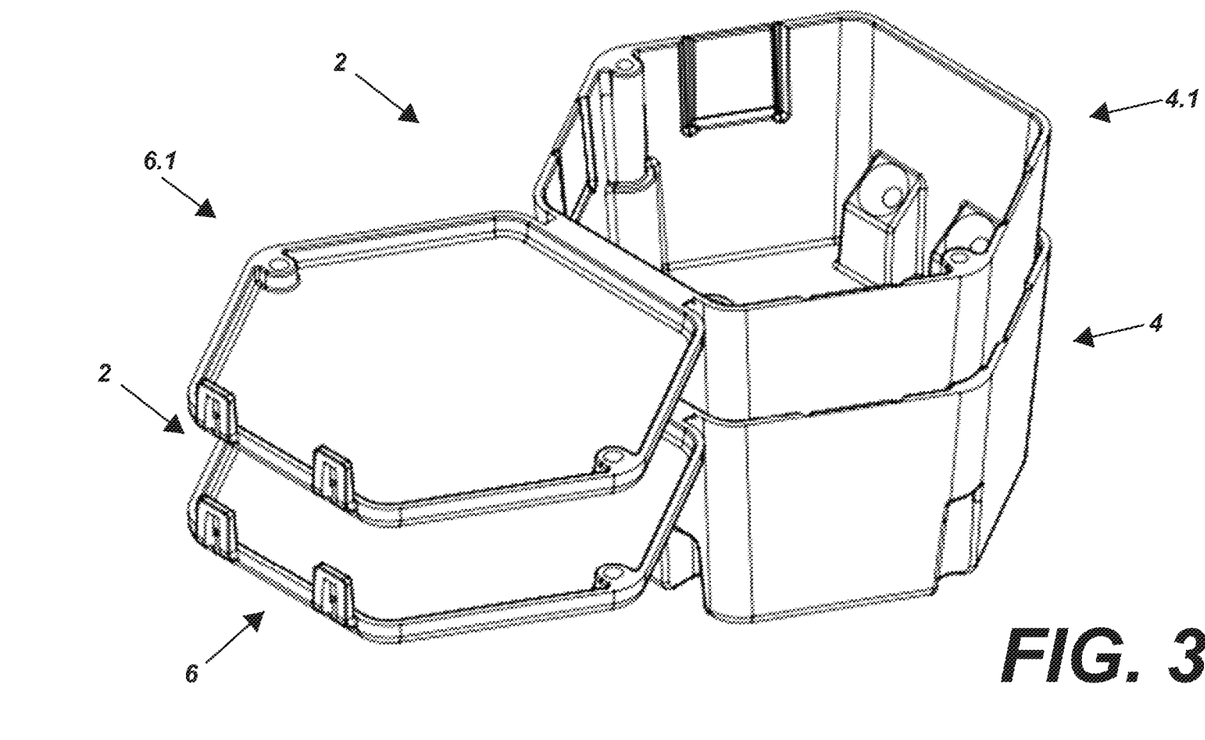
FIG. 3 is a three-dimensional top-down view thereof showing two embodiments nested together.
Figure 4:
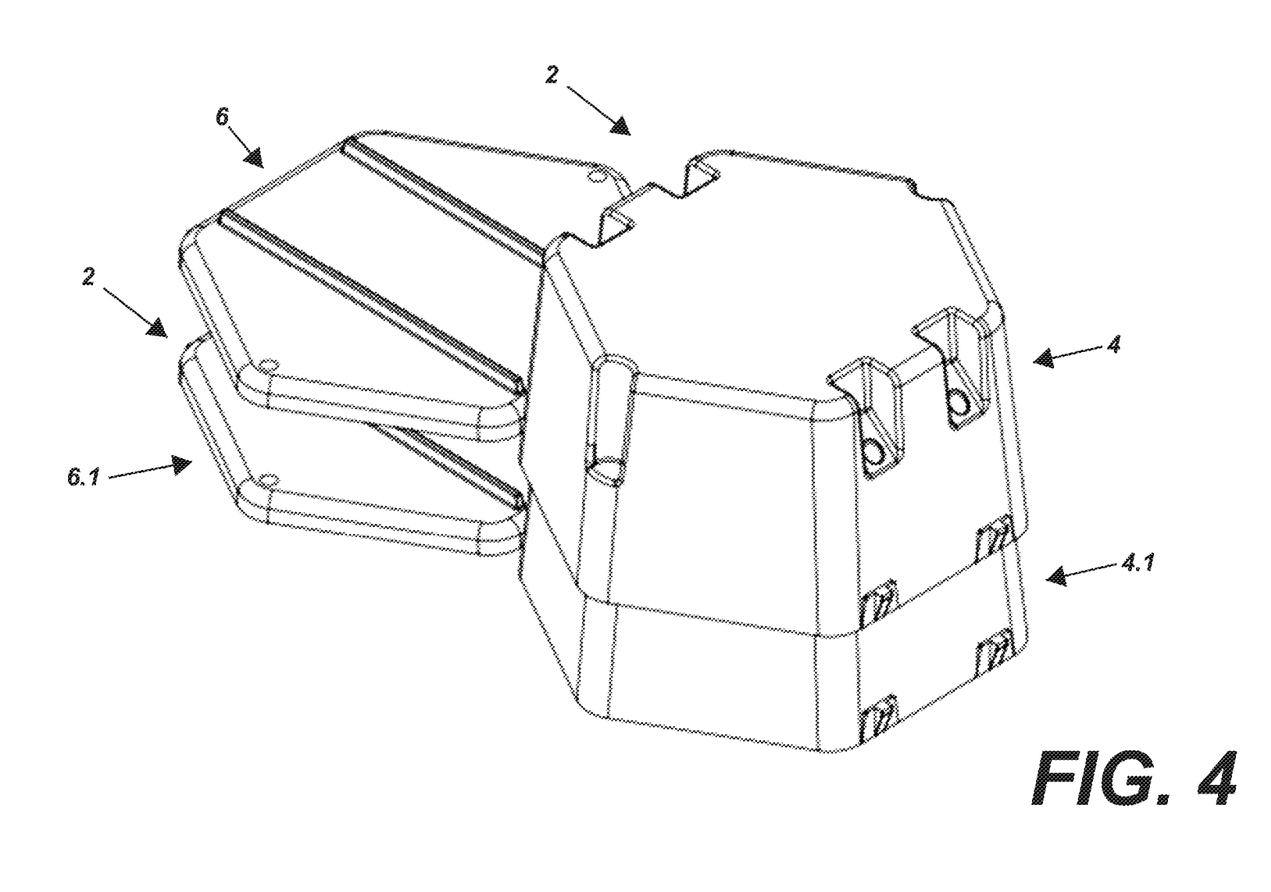
FIG. 4 is a three-dimensional bottom-up view thereof.
Figure 5:
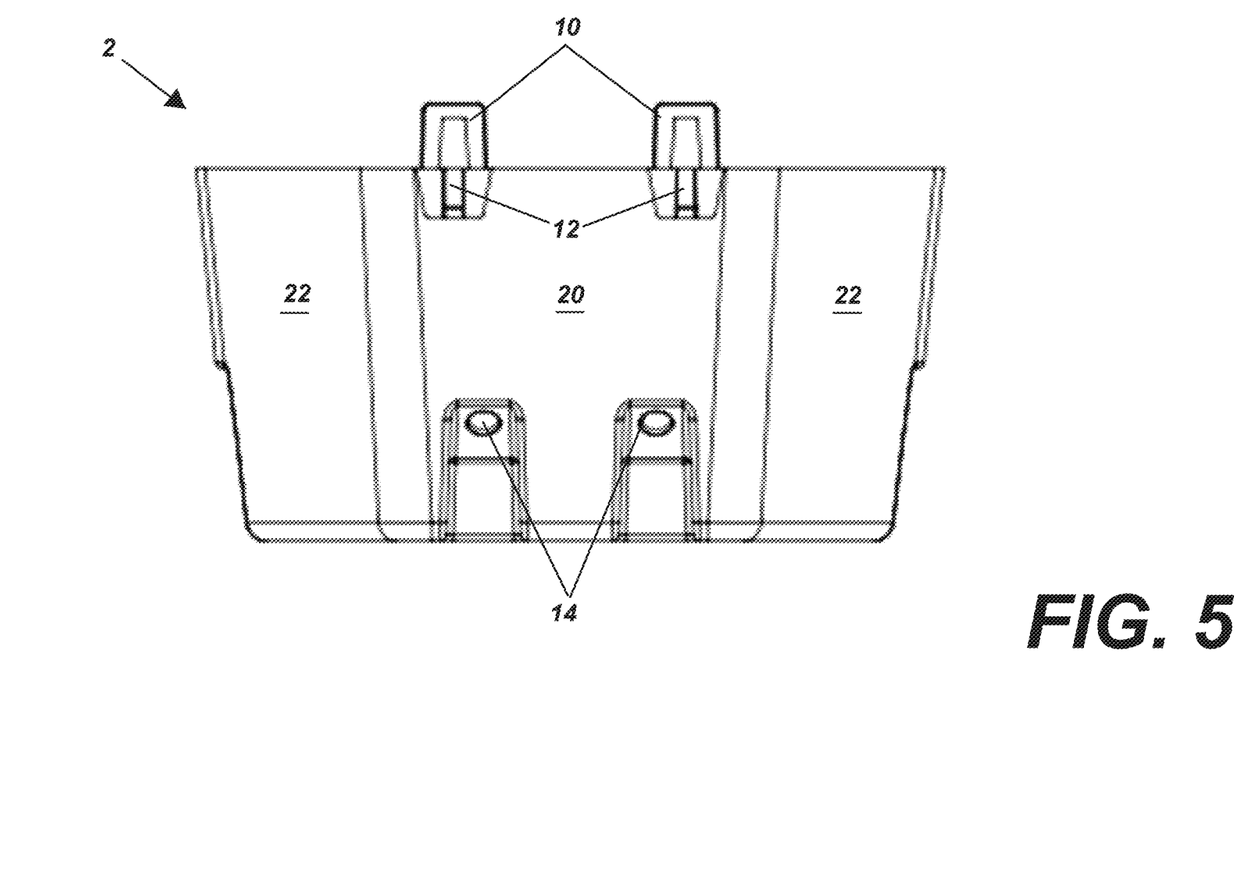
FIG. 5 is a front elevational view of the embodiment of FIG. 1.
Figure 6:
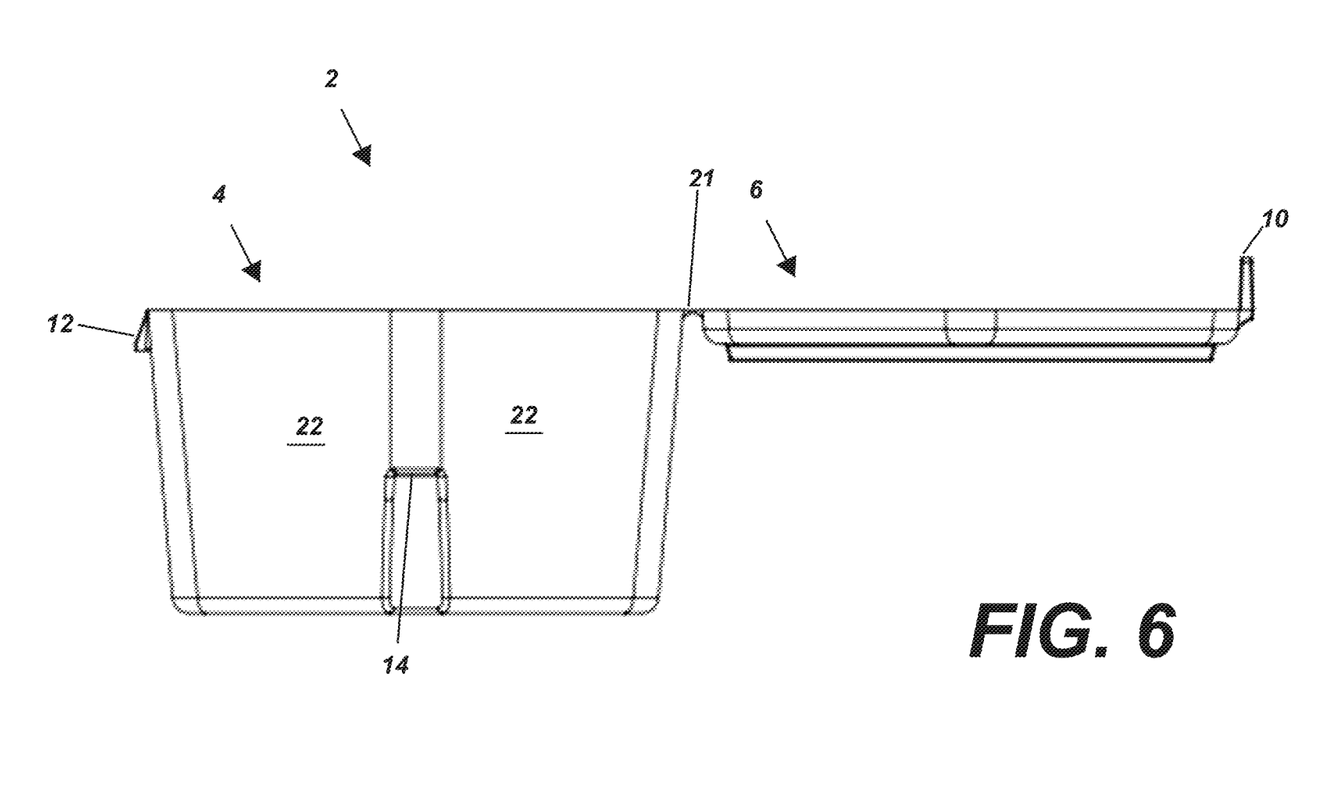
FIG. 6 is a side elevational view thereof.
Figure 7:
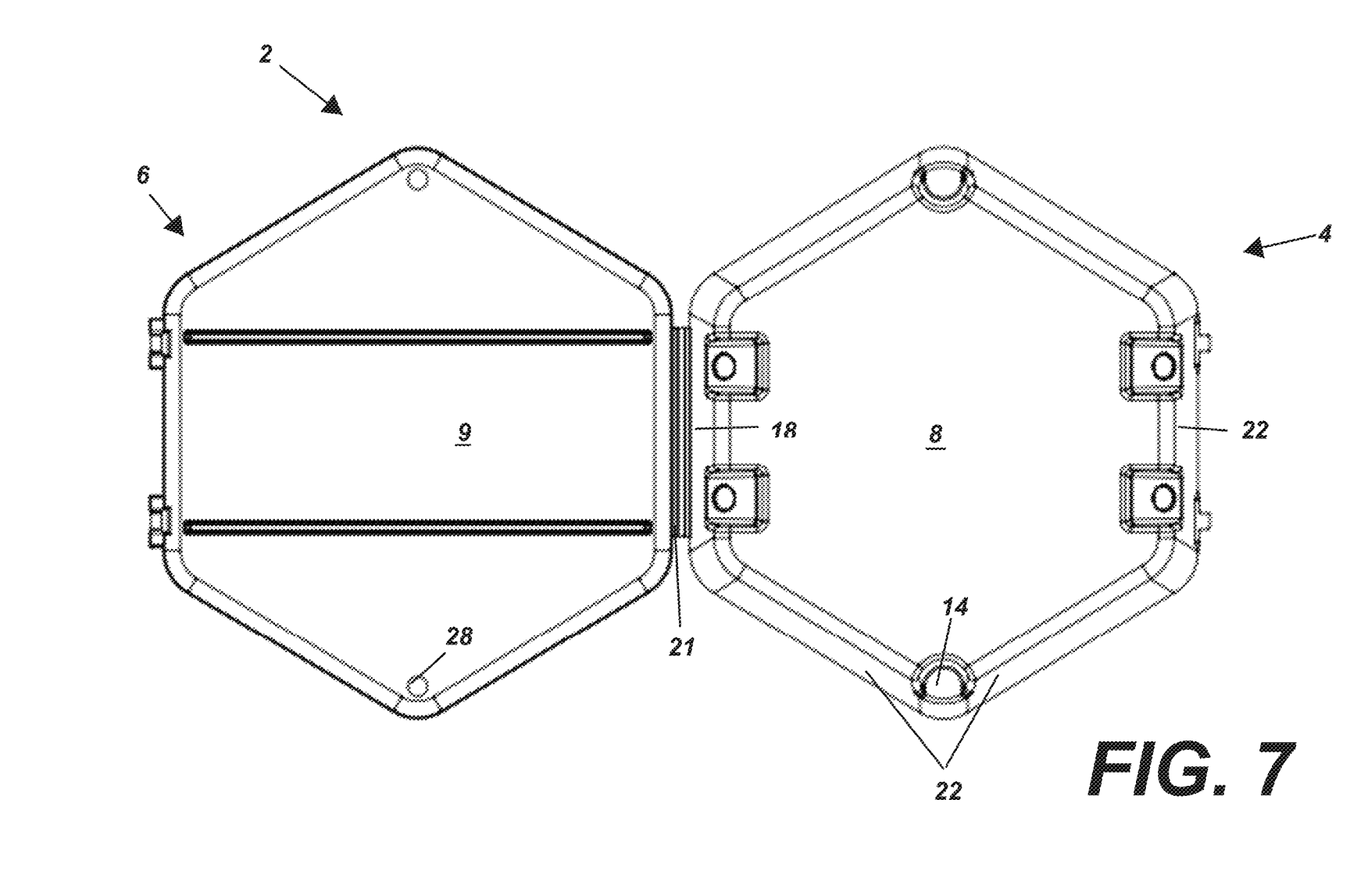
FIG. 7 is a bottom plan view thereof.
Figure 8:
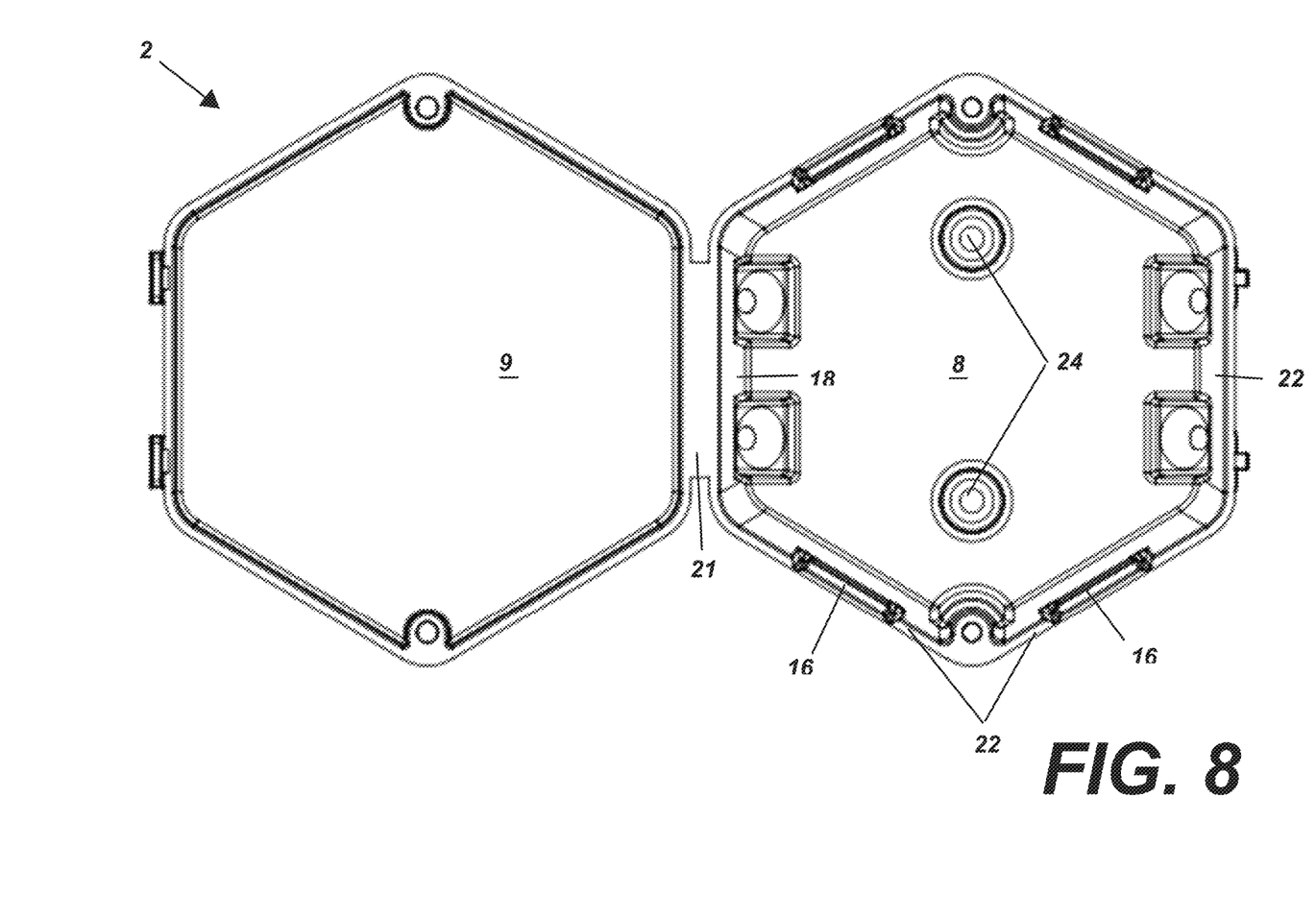
FIG. 8 is a top plan view thereof.
Figure 9:
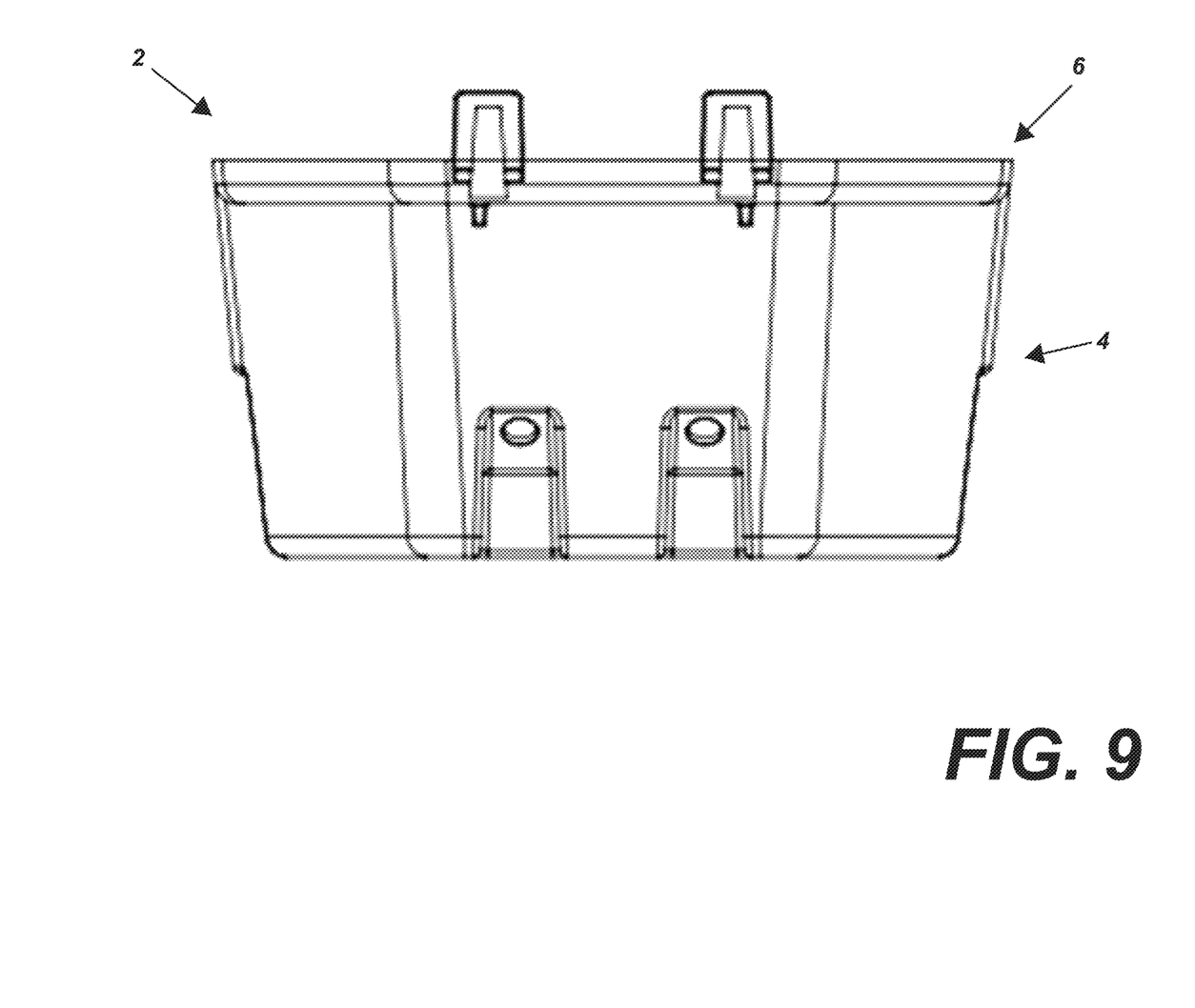
FIG. 9 is a front elevational view thereof shown in a closed orientation.
Figure 10:
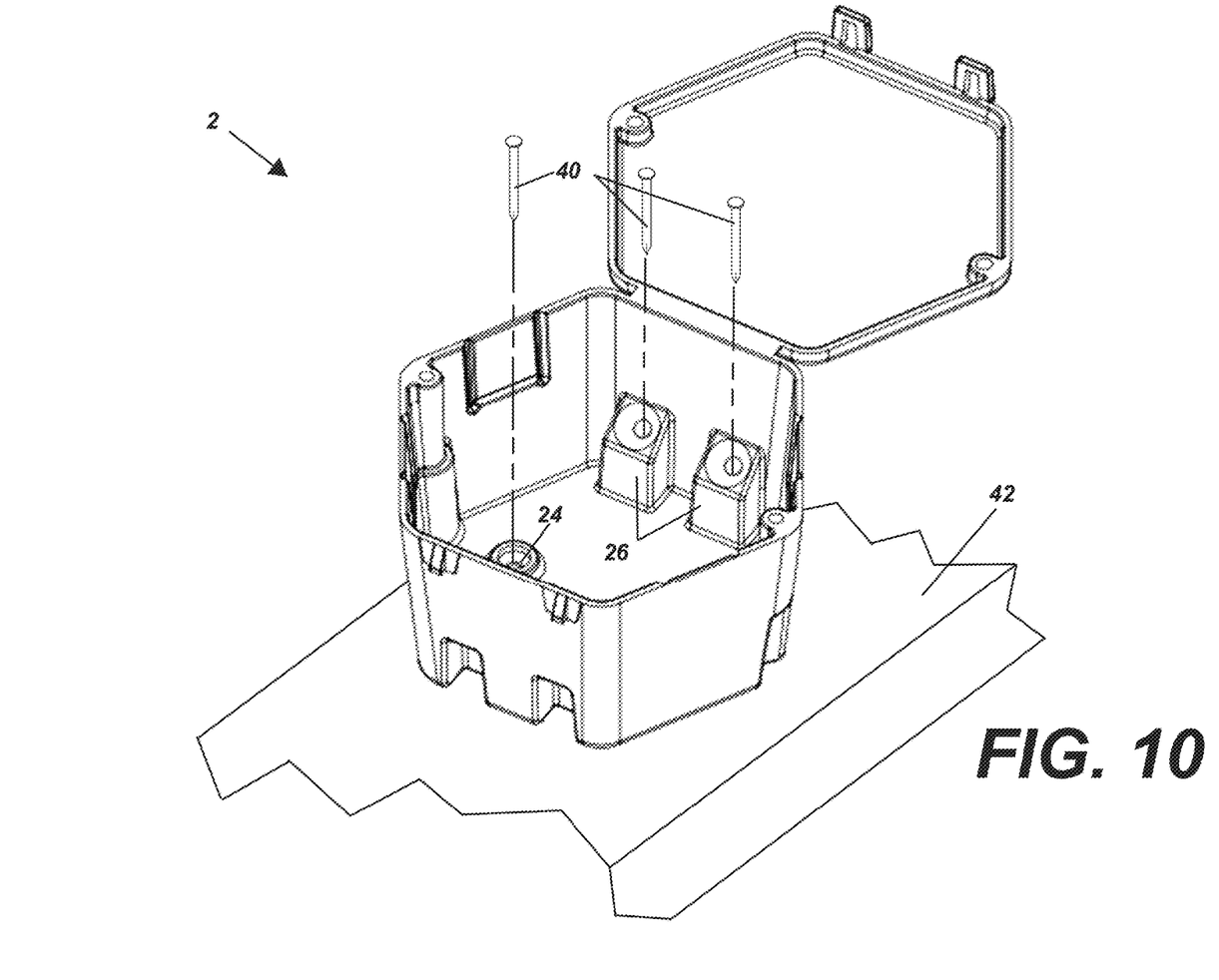
FIG. 10 is a three-dimensional isometric view showing the preferred embodiment of FIG. 1 in a typical environment being mounted to a surface.

Additional projections 26 within the interior of the base portion 14 could be used to draw additional wires into the box 2 or could be used for mounting the box to a surface 42 using mounting elements 40 which pierce through a thin layer of material covering the holes located in the projections 26 similar to the reinforced holes 24 as shown in FIG. 10.

As stated, the entire assembly of the box 2 is manufactured from a single, one-piece injection molding process and requires no additional parts other than mounting nails or screws. The doors 16 can be bent down and function as clamps when released to retain wires within the box. The lid 6 is easy to open about the living hinge 21 and securely clasps shut against the base 4 via the lid clasps 10, 12.

Figure 11:
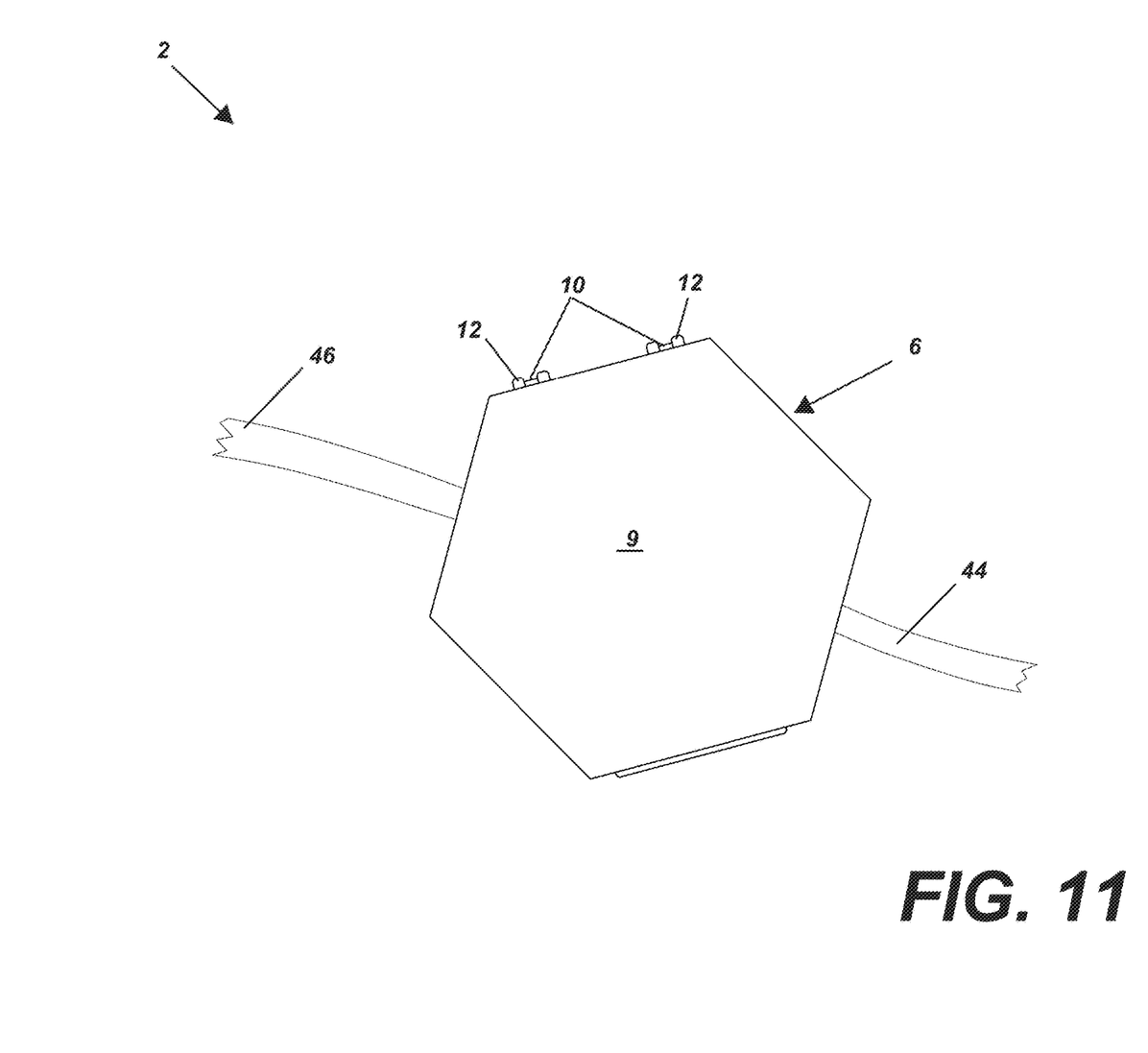
FIG. 11 is a top plan view of a preferred embodiment of the present invention in a closed orientation shown in a typical environment joining a splice.
Figure 12:
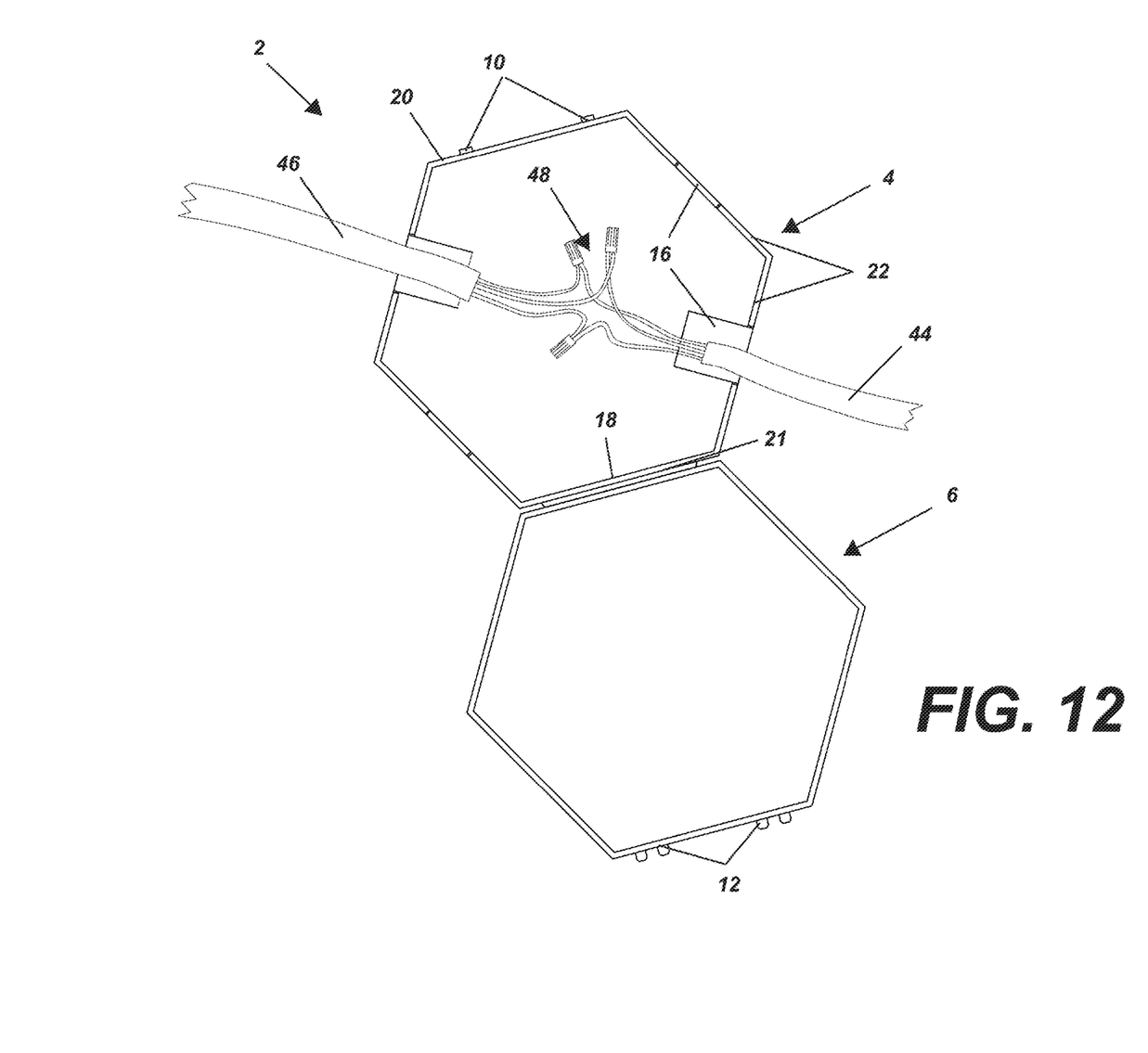
FIG. 12 is a top plan view thereof shown in an open orientation.

FIGS. 11 and 12 show how the device transfers from a closed orientation in FIG. 11 to an open orientation in FIG. 12 whereby the box 2 is used to join a splice 48 between a first line 44 and a second line 46. Two of the doors 16 are shown bent down to allow the wires 44, 46 to be inserted into the box and the various wires contained in each line being spliced together inside of the box 2 with wire nuts or other suitable splicing elements.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. An open splice electrical junction box for installation about a wire splice connection, the open splice electrical junction box comprising:
    a base portion and a lid portion joined by a living hinge, said base portion lid portion, and living hinge being formed from a one-piece injection molding process;
    said base portion comprising a front wall having a clasp receiver, a rear wall, a floor, and four side walls, wherein said front wall, rear wall, and four side walls form a hexagonal cross section;
    each of said four side walls including a door configured for receiving a plurality of wires joined to form a splice, said wires entering from an exterior of said base portion to an interior of said base portion, each said door being formed from said one-piece injection molding process and each being connected to their respective side wall via a living hinge;
    at least one mounting hole within said base portion configured for mounting said base portion to a surface;
    at least one reinforced opening within said floor of said base portion;
    said rear wall of said base portion connected to said lid portion via said lid living hinge; and
    a clasp connected to said lid portion, said clasp configured to seal said lid portion against said base portion via said clasp receiver.

2. The open splice electrical junction box of claim 1, further comprising at least one mounting hole within said lid portion lined up with a respective one of said at least one mounting hole of said base portion such that a mounting device passes through a respective one of said at least one mounting hole of said lid portion and further passes through said respective one of said at least one mounting hole of said base portion, thereby sealing said lid portion shut against said base portion via said mounting device.

3. The open splice electrical junction box of claim 1, wherein said base portion and said lid portion are formed of a non-electrically conductive material.

4. The open splice electrical junction box of claim 1, further comprising:
    at least one reinforced hole located in said floor of said base portion, said at least one reinforced hole being initially covered by a thin layer of material;
    said thin layer of material configured to be pierced by a mounting element; and
    said floor configured to be secured to said surface via said mounting element and said at least one reinforced hole.

5. The open splice electrical junction box of claim 1, further comprising:
    at least one projection located within said base portion, each respective one of said at least one projection having a mounting hole covered with a thin layer of material;
    said thin layer of material configured to be pierced by a mounting element; and
    said at least one projection configured to be secured to said surface via said mounting element.

6. The open splice electrical junction box of claim 1, wherein each respective one of said doors being configured to function as a clamp against a wire inserted through a space originally occupied by said respective one of said doors.

7. The open splice electrical junction box of claim 1, further comprising:
    wherein said lid portion has a larger surface area than said floor of said base portion, such that said base portion tapers inwardly from its top edge to said floor; and
    wherein a first of said open splice electrical junction box and a second of said open splice electrical junction box could be nested together while said lid portion is in an open orientation of each of said first and second said open splice electrical junction boxes due to said taper of said base portion.

\* \* \* \* \*